(12) United States Patent
Neufeld et al.

(10) Patent No.: US 8,770,390 B2
(45) Date of Patent: Jul. 8, 2014

(54) BELT CONVEYOR

(75) Inventors: Juan Neufeld, Winkler (CA); Samuel John Plett, Winkler (CA); Bernie Thiessen, Winkler (CA)

(73) Assignee: Woodhaven Capital Corp. (CA)

( * ) Notice: Subject to any disclaimer, the term of this patent is extended or adjusted under 35 U.S.C. 154(b) by 27 days.

(21) Appl. No.: 13/592,768

(22) Filed: Aug. 23, 2012

(65) Prior Publication Data

US 2014/0054135 A1 Feb. 27, 2014

(51) Int. Cl.
*B65G 21/14* (2006.01)

(52) U.S. Cl.
USPC ........... 198/812; 198/813; 198/814; 198/816; 198/860.3; 198/860.5

(58) Field of Classification Search
CPC ........ B65G 21/10; B65G 21/14; B65G 23/44; B65G 15/08; B65G 41/02; B66C 23/04
USPC .............. 198/812, 813, 814, 816, 818, 860.3, 198/860.5; 212/299, 348; 52/118
See application file for complete search history.

(56) References Cited

U.S. PATENT DOCUMENTS

| | | |
|---|---|---|
| 689,881 A | 12/1901 | Hoy |
| 855,745 A | 6/1907 | Argall |
| 874,982 A | 12/1907 | Norton |
| 2,864,488 A | 12/1958 | Taipale |
| 3,232,354 A | 2/1966 | Schlabs |
| 3,326,354 A | 6/1967 | Aydelott |
| 3,429,422 A | 2/1969 | Yoshimura |
| 3,715,840 A | 2/1973 | Davidson |
| 3,826,353 A * | 7/1974 | Greasley ...................... 198/313 |
| 4,166,351 A | 9/1979 | Nienberg |
| 4,321,996 A | 3/1982 | Sancken et al. |
| 4,944,386 A | 7/1990 | Swinderman |
| 5,030,173 A | 7/1991 | Bryant |
| 5,129,508 A | 7/1992 | Shelstad |
| 5,351,810 A | 10/1994 | Tingskog |
| 5,389,045 A | 2/1995 | Lyons |
| 5,511,652 A | 4/1996 | McGinnis |
| 5,577,563 A | 11/1996 | Holen |

(Continued)

FOREIGN PATENT DOCUMENTS

CA 2 698 709 A1 12/2010

OTHER PUBLICATIONS

Woodhaven Capital Corp., PCT/CA2013/000732 filed Aug. 22, 2013, "The International Search Report and the Written Opinion of the International Searching Authority, or the Declaration", mailed Nov. 29, 2013.

*Primary Examiner* — Leslie A Nicholson, III
(74) *Attorney, Agent, or Firm* — McKee, Voorhees & Sease, P.L.C.

(57) ABSTRACT

An improved conveyor belt assembly is provided with telescoping housing sections and a tension system for extending and retracting the sections relative to one another to maintain a selected tension on the conveyor belt. The assembly also has a lower end with a stepped profile matching the stepped profile of the cleated belt, so as to pick up and discharge fallen seeds or material and eliminate gaps where fallen seeds and material may collect. One or more scrapers are provided adjacent the lower track of the belt to push stray seeds and material off the lower track for pick up by the cleated belt at the lower end of the assembly.

12 Claims, 10 Drawing Sheets

(56) References Cited

U.S. PATENT DOCUMENTS

| | | |
|---|---|---|
| 5,623,885 A | 4/1997 | Haag |
| 5,687,798 A | 11/1997 | Henry et al. |
| 5,713,421 A | 2/1998 | Skjaeveland |
| 5,785,481 A | 7/1998 | Ockels |
| 5,888,044 A | 3/1999 | Baskerville |
| 6,170,646 B1 | 1/2001 | Kaeb et al. |
| 6,378,686 B1 | 4/2002 | Mayer et al. |
| 6,405,855 B1 | 6/2002 | Peltier et al. |
| 6,675,958 B2 | 1/2004 | Kaeb et al. |
| 6,964,551 B1 | 11/2005 | Friesen |
| 7,690,499 B2 | 4/2010 | Smith et al. |
| 7,909,153 B2 * | 3/2011 | Pogue .......................... 198/315 |
| 8,020,706 B2 | 9/2011 | Hendrickson et al. |
| 8,083,047 B1 | 12/2011 | Hermann et al. |
| 8,221,047 B2 | 7/2012 | Petersen et al. |
| 8,241,098 B1 * | 8/2012 | Latimer ....................... 460/114 |
| 8,397,901 B2 * | 3/2013 | Brouwer et al. ............. 198/588 |
| 2002/0175055 A1 | 11/2002 | Ryde |
| 2010/0068021 A1 | 3/2010 | Petersen et al. |
| 2010/0326798 A1 | 12/2010 | Friesen |
| 2011/0315518 A1 * | 12/2011 | Brouwer et al. ............. 198/617 |
| 2012/0006658 A1 * | 1/2012 | Hermann et al. ............ 198/812 |

* cited by examiner

BELT CONVEYOR

BACKGROUND OF THE INVENTION

Conveyors are often used for handling particulate material, for example, in the agricultural industry wherein seed or grain is being transferred. Portable agricultural conveyors generally include a tubular housing with an auger or conveyor belt extending therethrough to convey the seed or grain.

Prior art belt conveyors have several problems. First, the belts may stretch or become elongated due to high ambient temperatures or due to wear. Conventional belt conveyors typically include a slotted housing for adjustably mounting one of the belt pulleys so that the distance between the pulleys can be changed to accommodate such change in the belt length. However, such slots provide an opening through which seed or grain can leak or escape. Such loss of seed or grain is wasteful and costly.

Also, seed or grain often vibrates off the belt during operation of the conveyor, then slides down to reside in gaps or corners where it gets caught. These seed or grain remnants or residue must be cleaned out before a different product is conveyed through the conveyor so as to avoid contamination. Contamination of different hybrid seeds may result in an entire load of seeds being discarded, at considerable cost to the farmer.

Therefore, the primary objective of the present invention is the provision of an improved belt conveyor which eliminates the problems of the prior art.

Another objective of the present invention is the provision of a conveyor belt assembly which maintains a selected tension on the conveyor belt.

A further objective of the present invention is the provision of a conveyor belt assembly having telescoping housings which are spring biased so as to adjust to changes in the belt length.

Another objective of the present invention is the provision of a conveyor belt assembly having an improved tension system to maintain constant tension on the conveyor belt, even when the length of the belt changes.

Still another objective of the present invention is the provision of a conveyor belt assembly which precludes or minimizes collection of residual seed or grain in the assembly.

Yet another objective of the present invention is the provision of a conveyor belt assembly having one or more scrapers adjacent the upper surface of the lower belt track to scrape material off the lower track and moves it to the top surface of the belt.

Another objective of the present invention is the provision of a conveyor belt assembly wherein the lower end of the housing has a profile matching the belt profile so as to eliminate gaps between the housing and the belt where material can collect.

Yet another objective of the present invention is the provision of a conveyor belt assembly having a cleated belt with a stepped profile and a lower housing with a matching stepped profile such that grain or seed falling from the belt can be picked up by the cleats and carried to the discharge end of the conveyor assembly.

A further objective of the present invention is the provision of an improved conveyor belt assembly which is economical to manufacture, and durable and safe in use.

These and other objectives will become apparent from the following description of the invention.

SUMMARY OF THE INVENTION

The conveyor belt assembly of the present invention includes telescoping first and second housing sections with a tension system to adjust the extension and retraction of the sections relative to one another, and thereby maintain a selected tension on the conveyor belt. The tension system includes a pair of threaded shafts with a spring on each shaft, and a nut threadably mounted on the shaft to vary the spring force and thereby adjust the belt tension. The nuts can be tightened so as to extend one housing section and loosened to retract the one housing section. Thus, when the belt stretches due to temperature increases or wear, the springs will automatically extend the housing section to maintain constant tension on the belt.

The conveyor assembly also includes one or more scrapers between the upper and lower tracks of the belt, and adjacent the upper surface of the lower track so as to scrape seed and grain which may have fallen from the upper track onto the upper surface of the lower track during operation of the conveyor. The conveyor assembly also includes a lower housing portion having a profile which matches the profile of the cleated belt. The matching belt and housing profiles eliminates gaps or spaces between the belt and the housing where residual seed or grain may otherwise collect. Thus, any seed or grain falling from the belt before being discharged from the conveyor assembly will slide to the lower end for pick up by the belt cleats and eventual discharge from the conveyor assembly. Thus, the risk of residual seeds or grains contaminating different hybrids is minimized or eliminated.

DETAILED DESCRIPTION OF THE PREFERRED EMBODIMENTS

A belt conveyor assembly, according to the present invention, is generally designated by the reference numeral 10 in the drawings. The conveyor assembly 10 includes a base 12 with wheels 14 such that the assembly 10 is portable. The conveyor assembly 10 includes an inlet hopper 16 for receiving particulate material, such as seed or grain, and an outlet 18 for discharging the material from the conveyor assembly 10.

Figure 5:
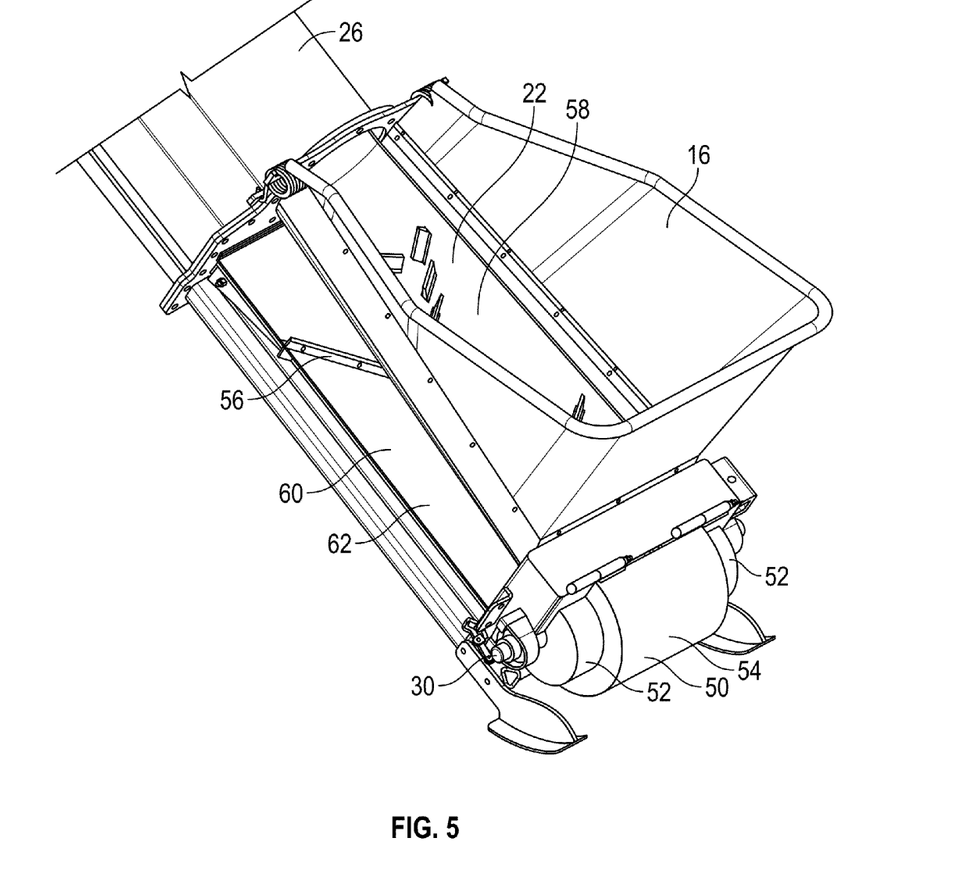
FIG. 5 is an enlarged view taken along line 5 of FIG. 1 showing the lower end of the conveyor assembly with the stepped profile of the lower housing section.
Figure 6:
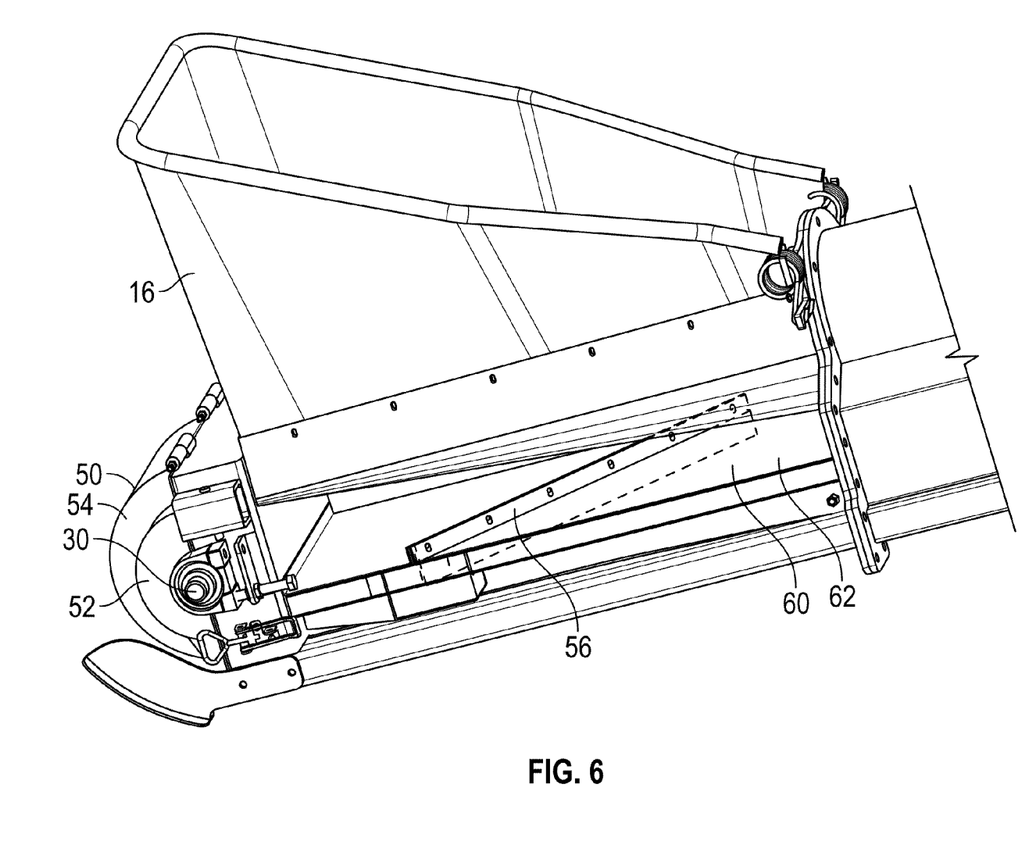
FIG. 6 is another perspective view of the lower end of the conveyor assembly from the opposite side of FIG. 5 and showing one of the scrapers of the present invention.
Figure 10:
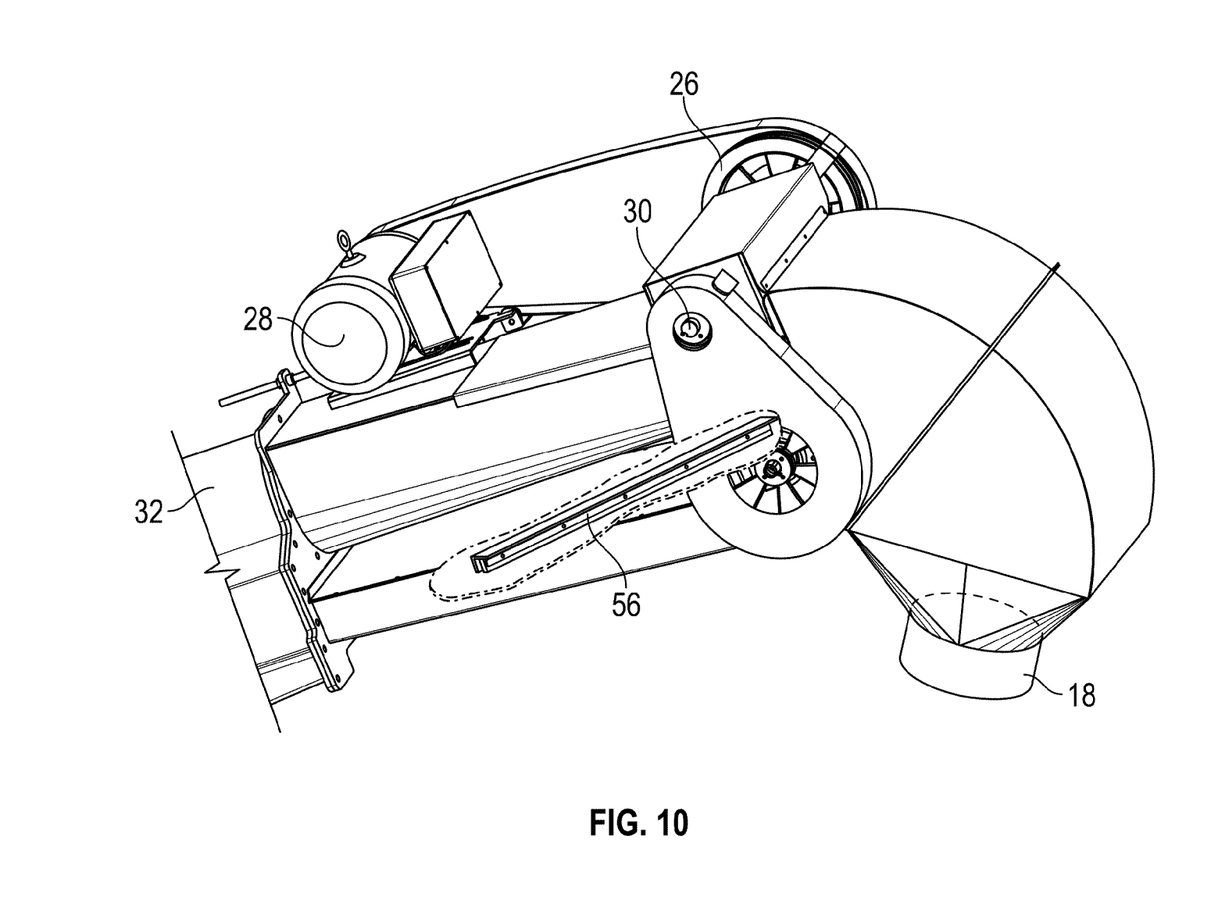
FIG. 10 is a perspective view of the upper end of the conveyor assembly showing another scraper according to the present invention.

The conveyor assembly 10 also includes an elongated housing 20 through which a conveyor belt 22 extends. Pulleys are rotatably supported at the inlet and outlet ends of the housing 20. The belt 22 is trained about the pulleys 24, 26, with one of the pulleys being driven by a motor 28. Each pulley is rotatably mounted on an axle 30, which is fixed relative to the respective inlet and outlet ends of the housing 20, as best seen in FIGS. 5, 6, and 10.

Figure 1:
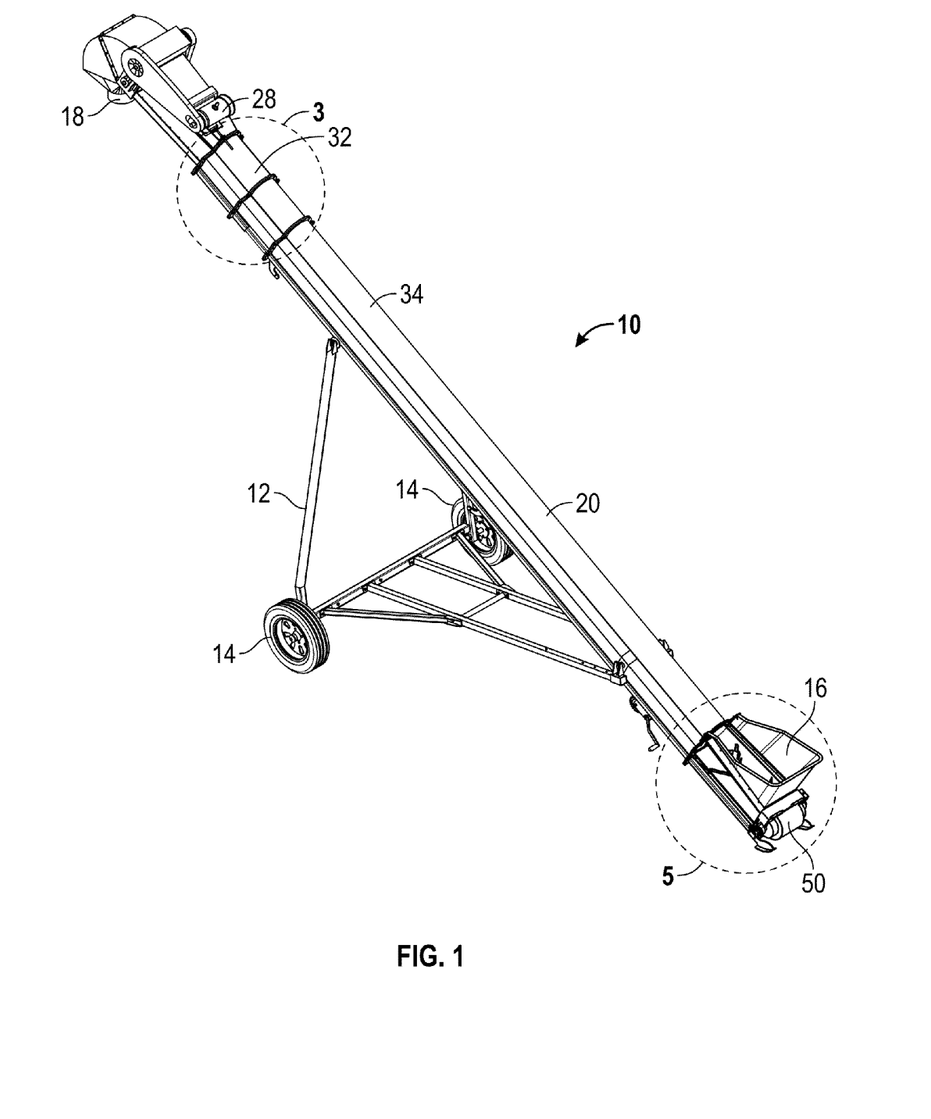
FIG. 1 is a perspective view of the conveyor belt assembly of the present invention.
Figure 2:
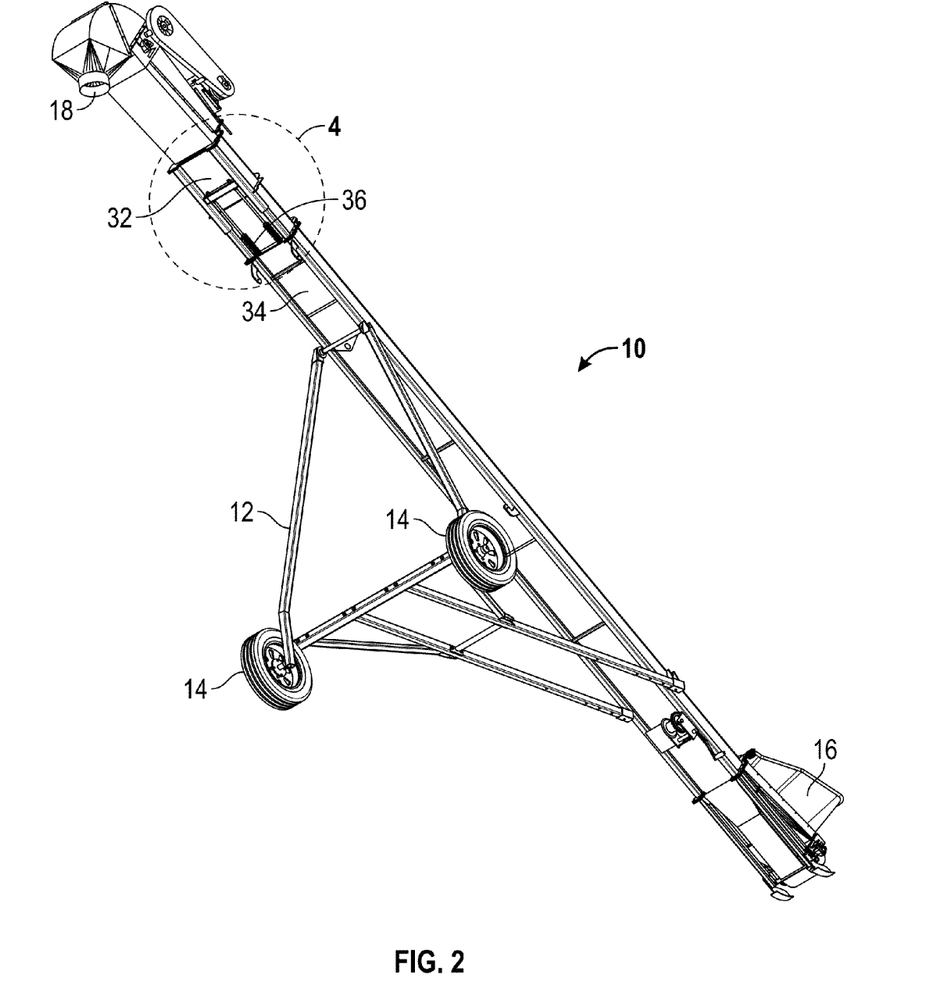
FIG. 2 is another perspective view of the conveyor belt assembly showing the tension system of the assembly.
Figure 3:
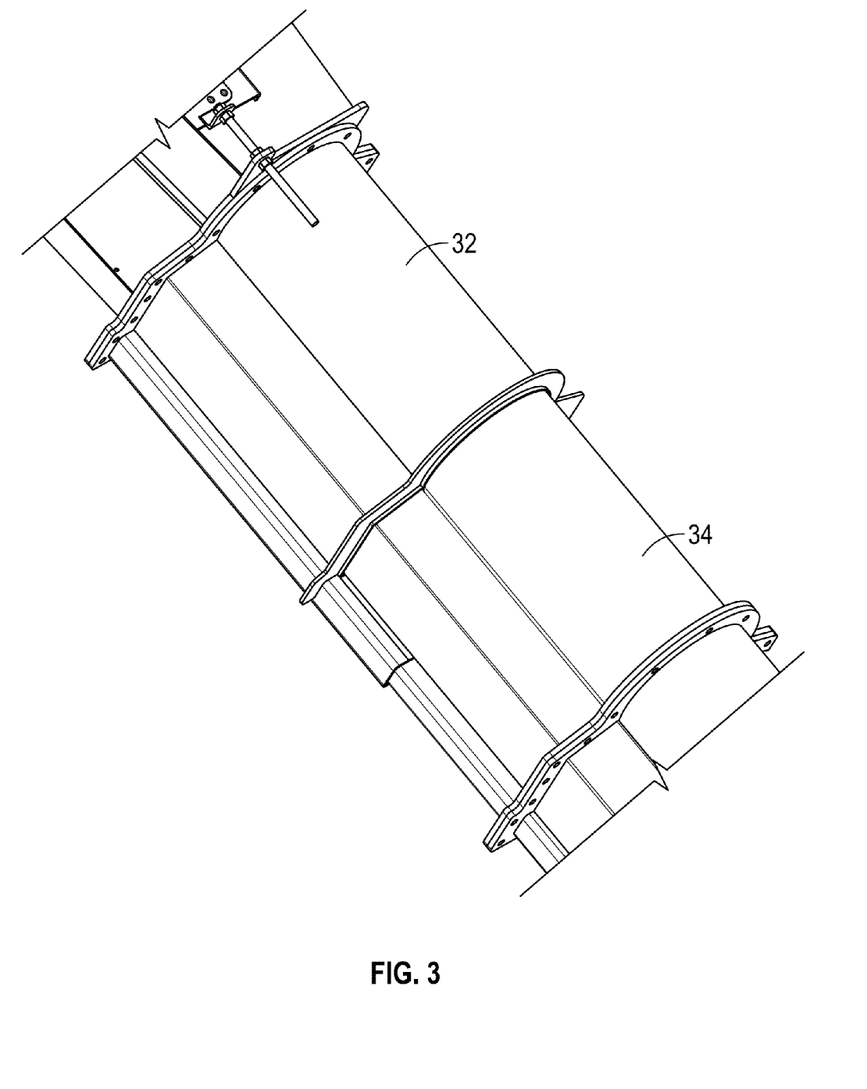
FIG. 3 is an enlarged perspective view taken along line 3 of FIG. 1 showing the telescoping housing sections of the conveyor assembly.
Figure 4:
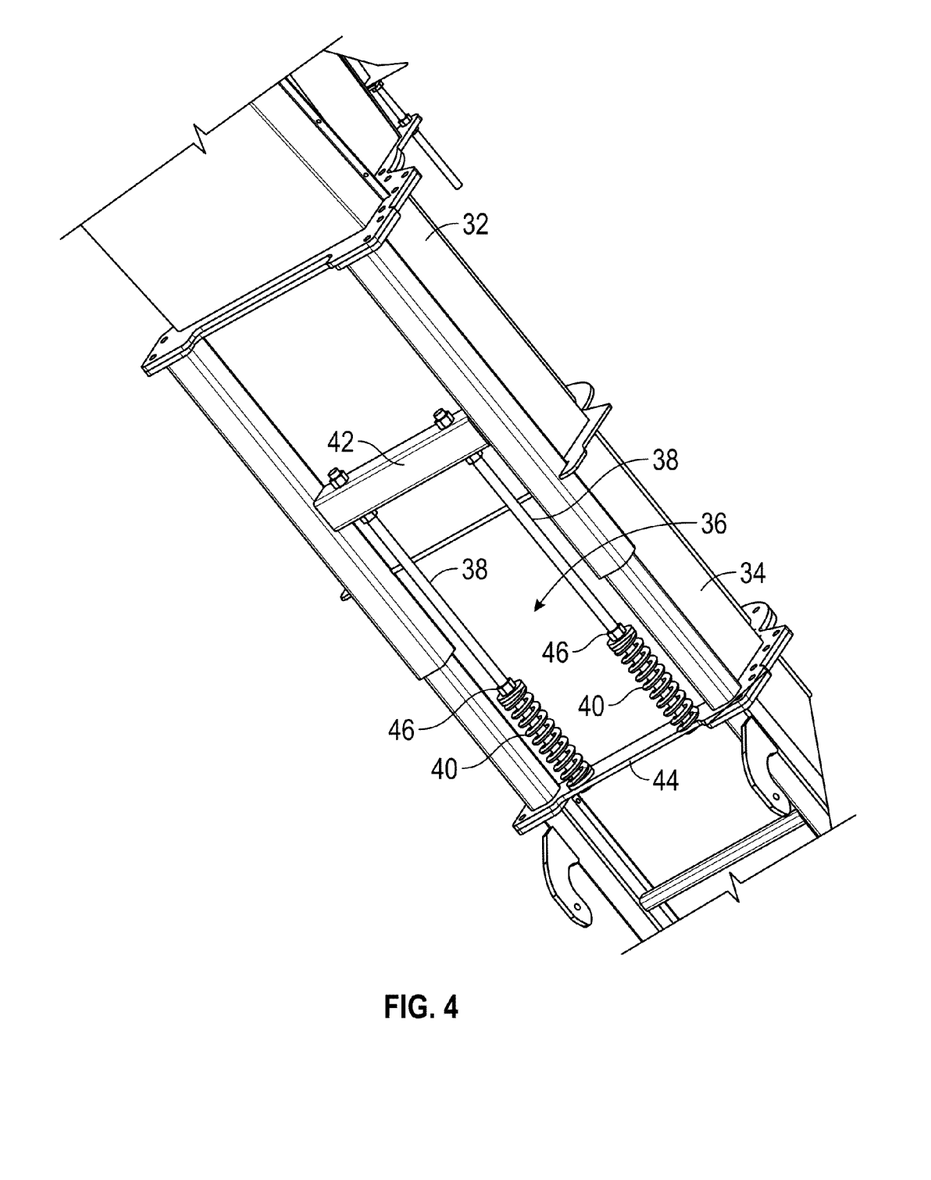
FIG. 4 is an enlarged view taken along line 4 of FIG. 2 showing the tensioning system of the conveyor assembly.

The housing 20 includes an upper section 32 and a lower section 34 which are telescopically coupled so that at least one of the sections 32, 34 can be extended and retracted relative to the other section. In the preferred embodiment, best seen in FIGS. 3 and 4, the upper section 32 extends and retract relative to the lower section 34. The extension and retraction of the upper section 32 is controlled by a tension system 36, which includes a pair of threaded shafts 38, each having a spring 40 mounted thereon. The opposite ends of the shafts 38 are secured to crossbars 42, 44 on the upper and lower sections 32, 34, respectively. A nut 46 is provided on each of the shafts 38 and can be tightened to compress the springs 40 or loosened to decompress the springs 40. As the nuts 46 are tightened, the springs 40 extend the upper section 32 of the housing 20 relative to the lower section 34 of the housing 20. Thus, the tension system 36 allows the tension on the belt 22 to be selected and maintained because the springs 40 provide a constant force between the crossbars 42, 44, depending upon the position of the nuts 46. Accordingly, if the length of the conveyor belt 22 changes due to temperature extremes and/or wear, the springs 40 will automatically extend or retract the upper section 32 of the housing 20 so that the selected tension on the belt 22 is maintained.

As an alternative to the springs 40, the tension system 36 may utilize other devices to exert force to maintain a selected tension on the belt 22, such as air cylinders.

Also, since the position of the pulleys on the housing sections 32, 34 are fixed, leakage or spillage of grain is avoided, as compared to prior art conveyor assemblies wherein the pulleys are adjusted via slots in the housing to accommodate dimensional changes in the belt.

Figure 7:
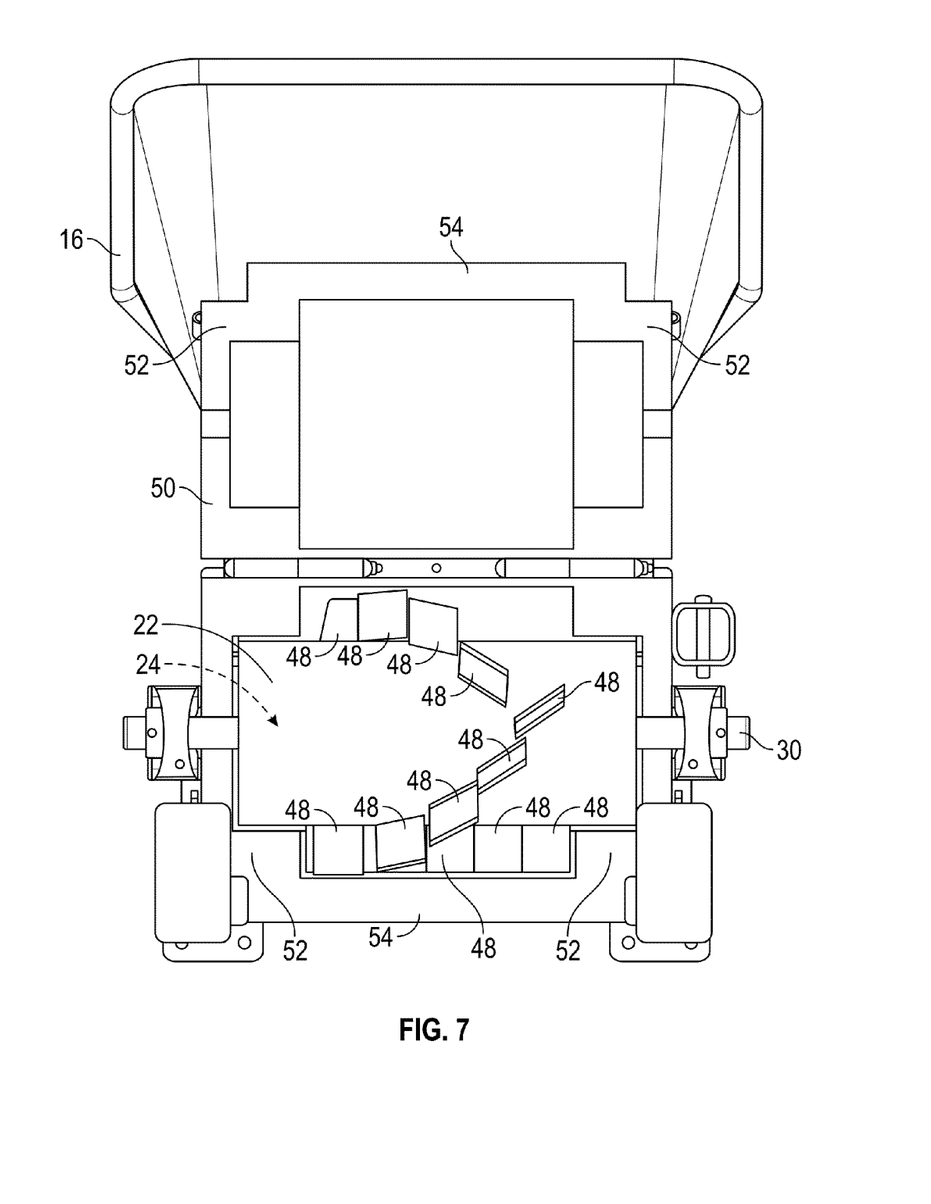
FIG. 7 is an end view of the lower end of the conveyor assembly, with the housing cover opened and showing the stepped profile of the lower end of the housing.
Figure 8:
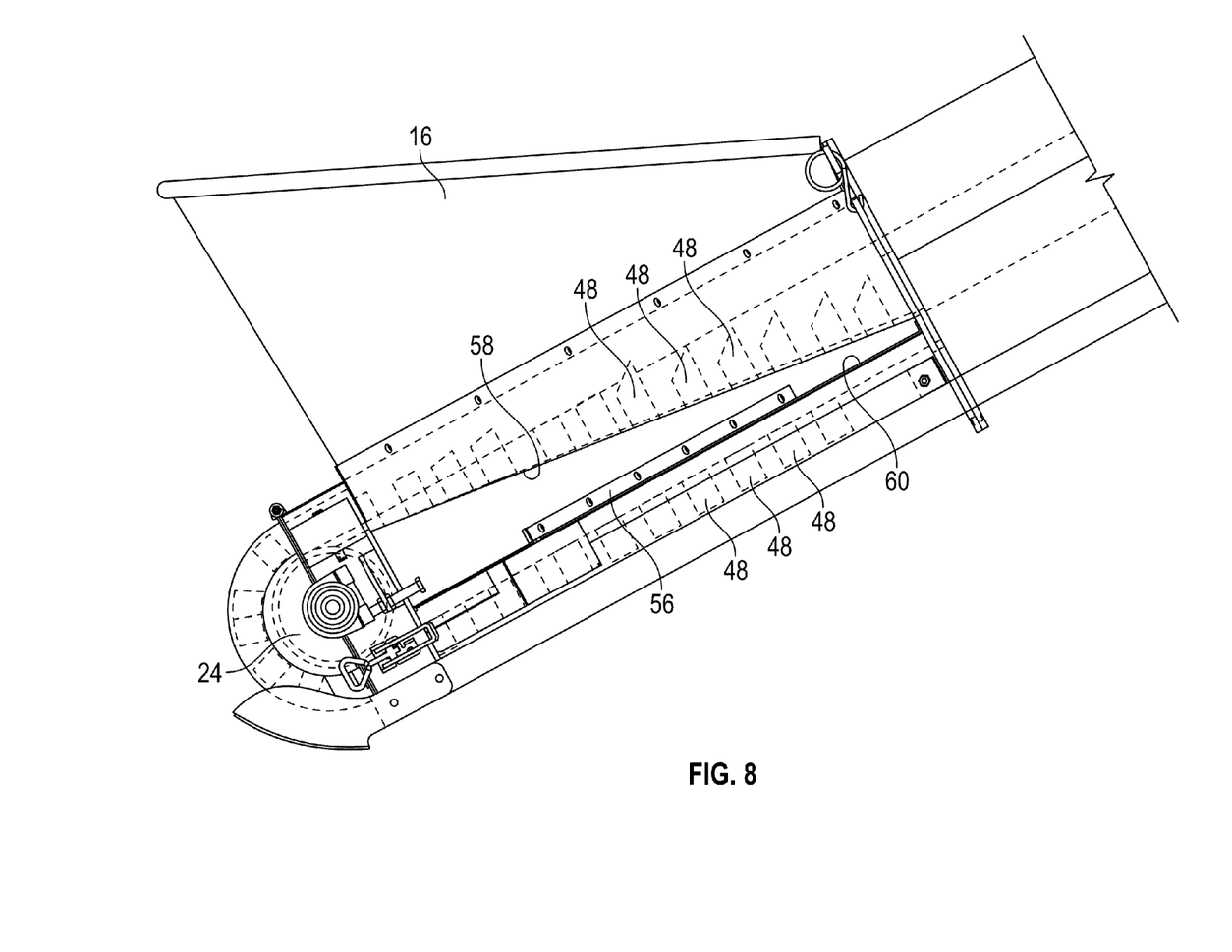
FIG. 8 is a side elevation view of the lower end of the conveyor assembly, and showing one of the scrapers according to the present invention.
Figure 9:
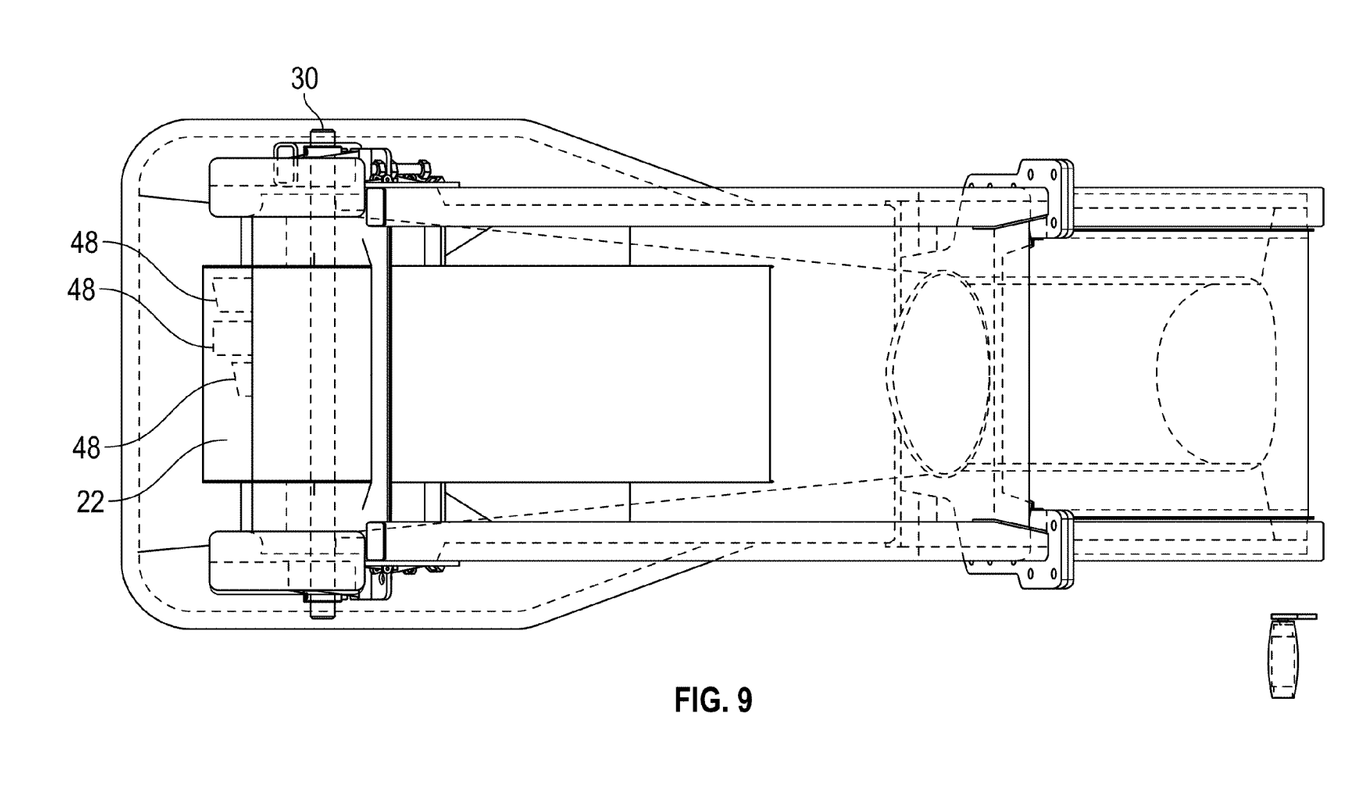
FIG. 9 is a bottom view of the lower end of the conveyor assembly.

The conveyor belt 22 preferably has a plurality of cleats 48 which extend partially across the width of the belt so as to define a stepped profile, as best seen in FIG. 7. Preferably, the cleats 48 do not extend to the opposite edges of the belt 22. The lower end of the lower housing section 34 is formed so as to have a stepped profile to match the stepped profile of the belt 22. As seen in FIGS. 5 and 7, the lower end of the housing section 34, including a hinged cover 50, have opposite sides having a diameter slightly larger than the diameter of the inlet pulley so that the sides 52 are spaced closely to the outer surface of the belt 22 adjacent the side edges of the belt. A central portion 54 of the lower end of the cover 50 and associated lower section 34 has a diameter slightly larger than the dimension of the cleats 48 as the cleats pass around the inlet pulley, as best seen in FIG. 7. Thus, all gaps and dead space around the belt 22 at the lower end of the housing 20 have been eliminated. Therefore, if the seed, grain, or other material carried by the belt 22 vibrates off the edges of the belt during operation of the conveyor assembly 10, such fallen material will slide down the housing sections 32, 34 to the lower end, wherein the cleats 48 will pick up such fallen material and carry the reclaimed material to the discharge outlet 18.

The conveyor assembly is also provided with one or more scrapers 56 which reside between the upper track 58 and lower track 60 of the belt 22, as seen in FIGS. 5, 6, 8, and 10. The scrapers 56 extend angularly across the belt 22 and adjacent the upper surface 62 of the lower track 60. Thus, if seed, grain, or other particulate material falls onto the upper surface 62 of the lower track 60 before being discharged from the outlet 18, the scrapers 56 will push such fallen material off the lower track 60 to the housing sections 32, 34, whereby the material will slide to the lower end for pick up by the cleats 48 as the belt 22 passes between the inlet pulley and the cover 50. The cover 50 can be moved from a normally closed position during operation of the conveyor assembly 10, to an open position, shown in FIG. 7, when the conveyor assembly is shut off for inspection and clean out of any fine material remaining in the lower housing section 34.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A belt conveyor assembly, comprising:
   a first housing section with a first pulley and a product inlet;
   a second housing section with a second pulley and a product outlet;
   a conveyor belt trained about the pulleys;
   a motor operatively connected to one of the pulleys to drive the conveyor belt;
   the housing sections being telescopically coupled so as to be extendable and retractable; and
   a tension system on the housing sections to adjust the extension and retraction of the housing sections when the belt length changes and thereby maintain tension on the conveyor belt.

2. The belt conveyor assembly of claim 1 wherein the tension system includes at least one threaded shaft extending between the housing sections, a spring mounted on the shaft, and a nut on the shaft to adjust the belt tension.

3. The belt conveyor assembly of claim 2 wherein the spring extends the second housing section relative to the first housing section when the nut is tightened, and retracts the second housing section relative to the first housing section when the nut is loosened.

4. The belt conveyor assembly of claim 1 wherein the tension system maintains constant tension on the belt.

5. The belt conveyor assembly of claim 1 wherein the first housing section is stationary, and the second housing section is movable relative to the first section.

6. The belt conveyor assembly of claim 1 wherein the assembly is a portable agricultural conveyor with wheels.

7. A belt conveyor assembly, comprising:
   first and second housing sections coaxially joined to form an elongated housing with an adjustable length;
   first and second pulleys at opposite ends of the housing;
   a conveyor belt trained about the pulleys; and
   a spring assembly including a threaded shaft with a nut to adjust the housing length and thereby controlling tensions on the conveyor belt.

8. The belt conveyor assembly of claim 7 wherein the first housing section is stationary and the second housing section is movable relative to the first housing section.

9. The belt conveyor assembly of claim 7 wherein the first and second housing sections are slidably connected to one another.

10. The belt conveyor assembly of claim 7 wherein the spring assembly extends between the first and second housing sections.

11. The belt conveyor assembly of claim 7 wherein the spring assembly includes a pair of laterally spaced springs on the housing.

12. The belt conveyor assembly of claim 7 wherein the spring 1 assembly includes a spring to extend and retract one of the housing sections relative to the other housing section.

\* \* \* \* \*